US012555324B2

(12) United States Patent
Baltrusaitis et al.

(10) Patent No.: US 12,555,324 B2
(45) Date of Patent: Feb. 17, 2026

(54) FACE IMAGE GENERATION WITH WRINKLES (71) Applicant: Microsoft Technology Licensing, LLC, Redmond, WA (US)

(72) Inventors: Tadas Baltrusaitis, Cambridge (GB); Charles Thomas Hewitt, Cambridge (GB); Erroll William Wood, Cambridge (GB); Chirag Anantha Raman, Delfgauw (NL)

(73) Assignee: Microsoft Technology Licensing, LLC., Redmond, WA (US)

( * ) Notice: Subject to any disclaimer, the term of this patent is extended or adjusted under 35 U.S.C. 154(b) by 46 days.

(21) Appl. No.: 18/761,299

(22) Filed: Jul. 1, 2024

(65) Prior Publication Data

US 2024/0355055 A1    Oct. 24, 2024

Related U.S. Application Data (63) Continuation of application No. 17/929,207, filed on Sep. 1, 2022, now Pat. No. 12,062,140.

(51) Int. Cl.
G06T 17/20  (2006.01)
G06T 9/00   (2006.01)
G06T 15/04  (2011.01)
G06T 15/06  (2011.01)

(52) U.S. Cl.
CPC .......... *G06T 17/205* (2013.01); *G06T 9/001* (2013.01); *G06T 15/04* (2013.01); *G06T 15/06* (2013.01)

(58) Field of Classification Search
CPC .................................................. G06T 17/205
See application file for complete search history.

(56) References Cited

U.S. PATENT DOCUMENTS

2007/0229498 A1*  10/2007  Matusik ............... G06T 17/20
                                              382/154
2018/0096511 A1*   4/2018  Beeler ................. G06V 40/16

* cited by examiner

*Primary Examiner* — Shivang I Patel
(74) *Attorney, Agent, or Firm* — Barta Jones, PLLC (57) ABSTRACT Computing an image depicting a face having an expression with wrinkles is described. A 3D polygon mesh model of a face has a non-neutral expression. A tension map is computed from the 3D polygon mesh model. A neutral texture, a compressed wrinkle texture and an expanded wrinkle texture are computed or obtained from a library. The neutral texture comprises a map of the first face with a neutral expression. The compressed wrinkle texture is a map of the first face formed by aggregating maps of the first face with different expressions using the tension map, and the expanded wrinkle texture comprises a map of the first face formed by aggregating maps of the first face with different expressions using the tension map. A graphics engine may be used to apply the wrinkle textures to the 3D model according to the tension map; and render the image from the 3D model.

20 Claims, 8 Drawing Sheets

TENSION MAP
EXPRESSION 1
506

TENSION MAP
EXPRESSION 2
508

TENSION MAP
EXPRESSION 3
510

FACE IMAGE GENERATION WITH WRINKLES

CROSS-REFERENCE TO RELATED APPLICATION

This application is a continuation application of and claims priority to U.S. patent application Ser. No. 17/929,207, entitled "FACE IMAGE GENERATION WITH WRINKLES," filed on Sep. 1, 2022, the disclosure of which is incorporated herein by reference in its entirety.

BACKGROUND

Generating synthetic images of faces of people and animals is extremely difficult to achieve in an efficient manner and where the resulting images are realistic. Synthetic images of faces of people and animals are useful for a large range of tasks such as video games, telepresence, film making, augmented and virtual reality, machine learning, computer vision.

The embodiments described below are not limited to implementations which solve any or all of the disadvantages of known face image generation processes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Photorealistic images of faces are generated where the images depict faces with expressions having wrinkles. By using wrinkle textures computed by aggregating maps of a face with different expressions it is possible to generate wrinkles for expressions even beyond those represented in input data.

In various examples there is a method of computing an image depicting a face having an expression with wrinkles. A 3D polygon mesh model of a face has a non-neutral expression. A tension map is computed from the 3D polygon mesh model. A neutral wrinkle texture, a compressed wrinkle texture and an expanded wrinkle texture are computed or obtained from a library. The neutral texture comprises a map of the first face with a neutral expression. The compressed wrinkle texture is a map of the first face formed by aggregating maps of the first face with different expressions using the tension map, and the expanded wrinkle texture comprises a map of the first face formed by aggregating maps of the first face with different expressions using the tension map. The wrinkle textures are applied to the 3D model according to the tension map. The image is rendered from the 3D model.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, generating synthetic images of faces of people and animals is extremely difficult to achieve in an efficient manner and where the resulting images are realistic. The inventors have found a way to boost the realism of synthetic faces by introducing dynamic skin wrinkles in response to facial expressions by using wrinkle textures that are formed from empirical data. Because the wrinkle textures are formed from empirical data the technique is said to be data driven. As a result significant performance improvements in downstream computer vision tasks such as facial landmark detection are found.

Alternative approaches for producing such wrinkles either require prohibitive artist effort to scale across identities and expressions or are incapable of reconstructing high-frequency skin details with fidelity.

The present technology produces realistic wrinkles across a large and diverse population of digital humans. The inventors formalize the concept of mesh-tension and use it to aggregate possible wrinkles from high quality expression scans into wrinkle textures. To synthesize face images, use these wrinkle textures to produce wrinkles even for expressions not represented in the source data.

A wrinkle texture is a map in UV space where the map can be expressed as a two dimensional array of numerical values, each numerical value being an albedo or a displacement. An albedo is a numerical value denoting color and displacement is a numerical value denoting displacement of a surface of a face depicted by the array element from a surface defined by a 3D mesh of the face. A wrinkle texture stores information from a plurality of maps in UV space depicting the same person or animal with different facial expressions. UV space is agnostic of camera viewpoint.

Figure 1:
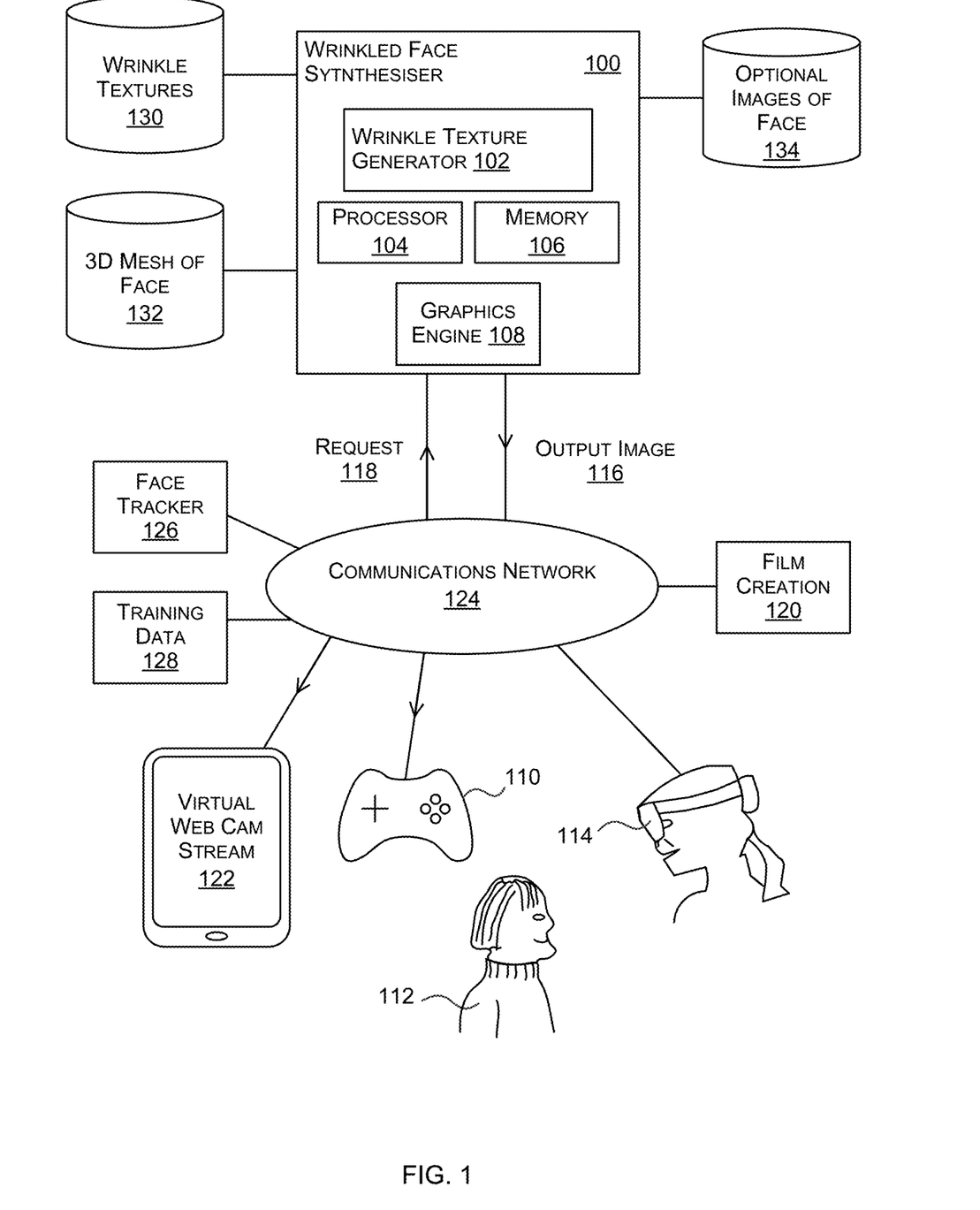
FIG. 1 is a schematic diagram of a wrinkled face synthesizer deployed in a communications network.

FIG. 1 is a schematic diagram of a wrinkled face synthesizer 100 for computing synthetic images of faces with expressions where there are wrinkles. In some cases the wrinkled face synthesizer 100 is deployed as a web service in communications network 124. In some cases the wrinkled face synthesizer 100 is deployed at a personal computer or other computing device which is in communication with a head worn computer 114 such as a head mounted display device. In some cases the wrinkled face synthesizer 100 is deployed in a companion computing device of head worn computer 114.

The wrinkled face synthesizer 100 comprises a wrinkle texture generator 102, at least one processor 104, a memory 106 and a graphics engine 108. The wrinkle texture generator 102 is computer implemented and computes wrinkle textures from images of a face 134 with different expressions as described in more detail below. The wrinkle textures may be stored in a library 130 for use by the wrinkled face synthesizer to render images depicting faces with wrinkles. In some examples, a wrinkle texture is computed from images of a specified identity (i.e. a specified person or animal). In some cases the wrinkle texture generator 102 is able to compute wrinkle textures by using wrinkle textures from the library 130 (in a process referred to as wrinkle grafting) rather than computing wrinkle textures from scratch.

The wrinkled face synthesizer 100 has access to a three-dimensional 3D mesh 132 of a face, where the mesh is a polygon mesh. The 3D mesh is stored at any location accessible to the wrinkled face synthesizer 100. In some examples, the mesh depicts a generic face with a neutral expression. A neutral expression is an expression of a face when at rest where wrinkles on the face are minimal. In an example, a neutral expression of a person's face is where the eyes are open and the mouth is closed.

The graphics engine 108 is any well-known computer graphics engine which takes the 3D mesh 132, applies at least one wrinkle texture to the 3D mesh 132 according to a tension map and renders an image from the 3D mesh with the applied wrinkle texture. Thus the graphics engine 108 computes output images depicting a face with wrinkles. In some examples the graphics engine is a well-known rasterization engine using rasterization to render the image from the 3D model, or the graphics engine is a well-known ray-tracing engine using ray-tracing to render the image from the 3D model. Examples of suitable commercially available ray-tracing engines are: Blender Cycles (trade mark), Autodesk Arnold (trade mark). Examples of suitable commercially available rasterization engines are: Unity (trade mark), Unreal (trade mark).

The wrinkled face synthesizer 100 is configured to receive requests 118 from client devices such as smart phone 122, computer game apparatus 110, head worn computer 114, film creation apparatus 120 or other client device. The requests are sent from the client devices over a communications network 124 to the wrinkled face synthesizer 100.

In an example, a request from a client device comprises an image of a face in a neutral expression and values of expression parameters of the 3D mesh 132. The wrinkled face synthesizer, in response to the request, computes a synthetic output image 116 of the face with the expression according to the expression parameters, and having wrinkles appropriate for the expression. This is achieved even where the expression was absent from data used to create the wrinkle textures 130.

In another example, a request from a client device comprises an identity (of a person or animal) for which at least one wrinkle texture exists in library 130 and values of expression parameters of the 3D mesh 132. The wrinkled face synthesizer, in response to the request, computes a synthetic image of a face using the wrinkle texture for the identity. The synthetic output image 116 depicts the face with the expression according to the expression parameters, and having wrinkles appropriate for the expression and the identity. This is achieved even where the expression was absent from data used to create the wrinkle texture of the identity.

In another example, a request 118 from a client device is a request to generate an image of a default or random face with a default or random expression. In this case the wrinkled face synthesizer 100 uses default or random expression parameter values of the 3D mesh 132 and selects a wrinkle texture from the library 130 at random or as a default. The synthetic output image 116 depicts a face with the expression according to the expression parameters and having wrinkles according to the selected wrinkle texture.

The wrinkled face synthesizer 100 receives a request 118 and in response generates a synthetic output image 116 which it sends to the client device. The client device uses the output image 116 for one of a variety of useful purposes including but not limited to: generating a virtual webcam stream, generating video of a computer video game, generating a hologram for display by a mixed-reality head worn computing device, generating a film. The wrinkled face synthesizer 100 is able to compute synthetic images of a dynamic face having changing expressions and wrinkles, for particular specified expressions and particular specified viewpoints, on demand. In an example, the dynamic scene is a face of a talking person. The wrinkled face synthesizer 100 is able to compute synthetic images of the face from a plurality of viewpoints and with any specified dynamic content. Non-limiting examples of specified viewpoints and dynamic content are: plan view, eyes shut, face tilted upwards, smile; perspective view, eyes open, mouth open, angry expression. Note that the wrinkled face synthesizer 100 is able to compute synthetic images for facial expressions which were not present in data used to compute the wrinkle textures 130.

In some examples the wrinkled face synthesizer is used to generate training data 128 comprising images depicting faces with different expressions and identities. The training data 128 is used to train a machine learning system such as for generating photorealistic images depicting faces or other tasks.

In an example a face tracker 126 tracks values of parameters of the 3D mesh from a video of a person's face where the person has given appropriate consents to use of their data. The parameter values from the face tracker 126 are used in the 3D mesh to enable synthetic images of the person's face to be rendered by the wrinkled face synthesizer. The synthetic images are used for an avatar of the person such as for telepresence, video conferencing or other applications.

The wrinkle texture of the disclosure operates in an unconventional manner to achieve rendering of images depicting faces with expressions and appropriate wrinkles.

Using a wrinkle texture improves the functioning of the underlying computing device by enabling rendering of images depicting faces with expressions and appropriate wrinkles.

Alternatively, or in addition, the functionality of the wrinkled face synthesizer 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
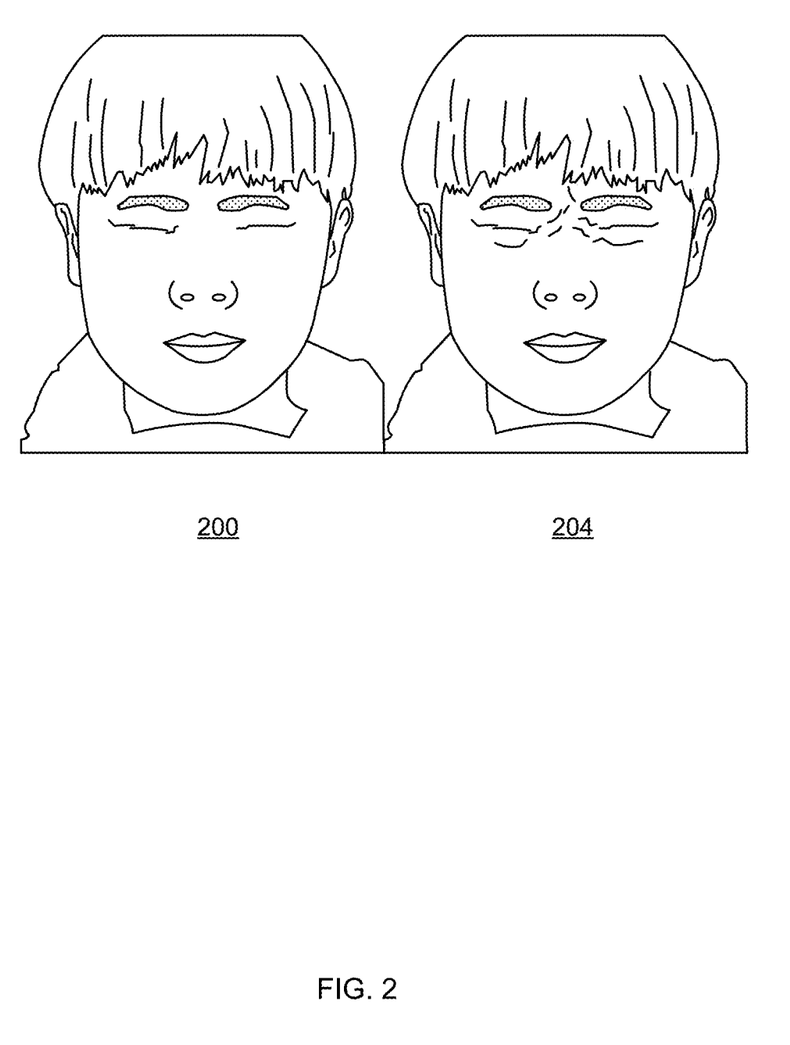
FIG. 2 is a schematic diagram of a synthetic image of a face without wrinkles and of the same synthetic image with wrinkles.

FIG. 2 is a schematic diagram of a synthetic image 200 of a face without wrinkles and of the same synthetic image 204 with wrinkles computed using technology as described herein. The synthetic image 204 has wrinkles between the eyes and under the eyes and these are appropriate to the facial expression with the eyes being pressed tight shut. Note that the line drawings in FIG. 2 were created by tracing over full color photorealistic images and therefore much detail is absent although the wrinkles are shown at least schematically. FIG. 2 is included to aid understanding of the technology rather than as a complete representation of output images from the technology.

Figure 3:
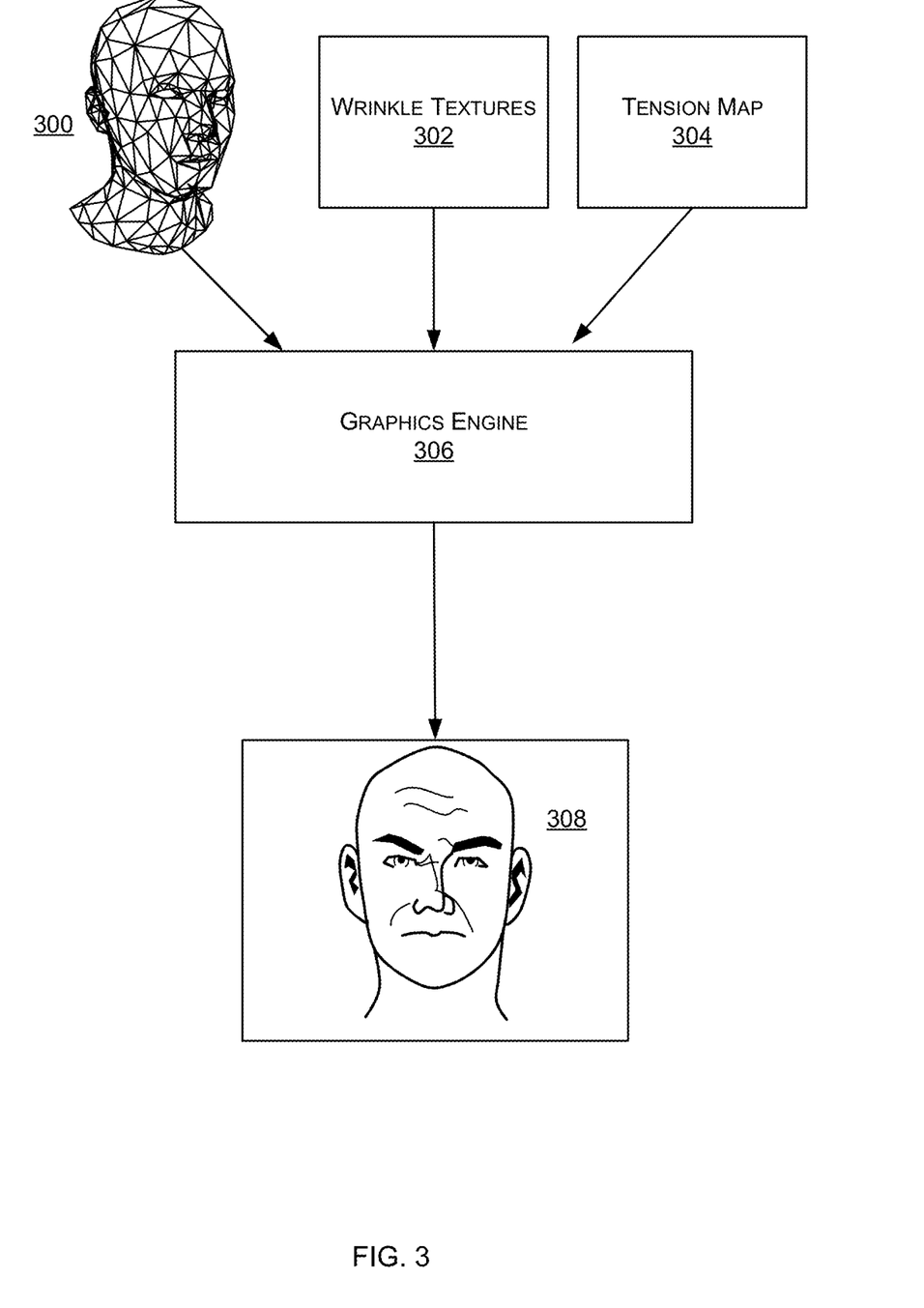
FIG. 3 is a flow diagram of a method of generating a synthetic image of a face with wrinkles.

FIG. 3 is a flow diagram of a method of generating a synthetic image of a face with wrinkles. The method of FIG. 3 is performed by the wrinkled face synthesizer 100. A graphics engine 306 is available and takes as input a 3D face mesh 300, a plurality of wrinkle textures 302, and a tension map 304.

The 3D mesh is of a face and is a polygon mesh such as a triangle mesh or other polygon mesh. The 3D mesh is a model of a face in a non-neutral expression such as where values of parameters have been applied to the 3D mesh in order to apply the non-neutral expression to the 3D mesh.

The wrinkle textures 302 comprise at least a neutral texture, a compressed wrinkle texture and an expanded wrinkle texture as explained in more detail later in this document. In some examples there are five wrinkle textures 302 for a single identity (i.e person or animal): a neutral texture, a compressed albedo wrinkle texture, an expanded albedo wrinkle texture, a compressed displacement wrinkle texture, an expanded displacement wrinkle texture. A neutral texture is a map of a face with a neutral expression where a map may be a UV map. A compressed wrinkle texture is a map of a face formed by aggregating maps of the first face with different expressions using a tension map. An expanded wrinkle texture is also a map of the first face formed by aggregating maps of a face with different expressions using the tension map.

A tension map may be a UV map where numerical values in the map denote amounts of compression or expansion. In an example a tension map is computed from the 3D polygon mesh model 300, the tension map comprising, for an individual vertex of the 3D polygon mesh, an amount of compression to be applied to move the vertex to a position modelling the face of the person with a neutral expression, and an amount of expansion to be applied to move the vertex to a position modelling the face of the person with a neutral expression. The compressed wrinkle texture has negative values from the tension map and the expanded wrinkle texture has positive values from the tension map.

The graphics engine 306 applies the wrinkle textures 302 to the 3D face mesh 300 according to the tension map 304. That is the tension map 304 is used as weights to blend the wrinkle textures. Thus for any arbitrary expression beyond those represented in source images, the process blends between wrinkle textures using a notion of the tension in the face mesh to obtain dynamic wrinkling effects. The graphics engine renders images 308 from the 3D face mesh 300 having the applied wrinkle textures. Thus the graphics engine renders photorealistic images of faces with expressions and having wrinkles appropriate for the expressions. In the example of FIG. 3 an image 308 is rendered (shown schematically as a line drawing in FIG. 3) and depicts the face from the 3D mesh model 300 with the expression of the 3D mesh model 300 and having wrinkles on the forehead, between the eyes and from the nose towards the mouth. In this way dynamic, expression dependent wrinkles are achieved in an efficient manner. By using wrinkle textures scalability is achieved since wrinkle textures enable generalization to wrinkles which are not observed in the data used to create the wrinkle textures. The process of FIG. 3 is an efficient yet effective method for incorporating expression-based wrinkles into synthetic images of faces. Alternative approaches using artist-defined bump or normal maps suffer from three drawbacks. First, the bump and normal maps only simulate underlying geometry changes; the silhouette and shadows which are of relevance for face related tasks such as landmark localization remain unaffected. Second, the bump or normal map methods do not affect the albedo or diffuse textures. Finally, the most crucial drawback is scale. The bump or normal map methods entail manual definition of wrinkle maps and masks for every blendshape for every character. In contrast, the present automatic mesh-tension driven method naturally scales with the number of identities and expressions, while incorporating real wrinkles for both albedo and displacement textures from scans. Furthermore, the present technology handles identities without expression scans, transferring plausible wrinkles from the most similar neutral textures as now explained with reference to FIG. 4.

The inventors have found that using tension in the face mesh enables automatic scaling of the methods described herein with identity and expressions, which is a bottleneck for other wrinkling approaches that rely on prohibitive artist efforts. In addition to eliminating manual effort, the present data-driven approach also enables the capturing of real wrinkles from scans which doesn't require artistic judgment.

By boosting the realism of synthetic faces with dynamic wrinkles, the methods described herein give an explicit case for realistic synthetics from an empirical standpoint: the methods yield improved performance for models on down-stream tasks such as facial landmark recognition. In addition, the broader approach also enables the mitigating of undesirable biases in models from a societal perspective. Synthesizing a dataset with diverse faces across races and genders involves significantly less manual work than collecting well-represented datasets in the wild. Consequently, down-stream real-life systems developed using such synthetic data are less likely to suffer from unfair biases along these sensitive variables.

Figure 4:
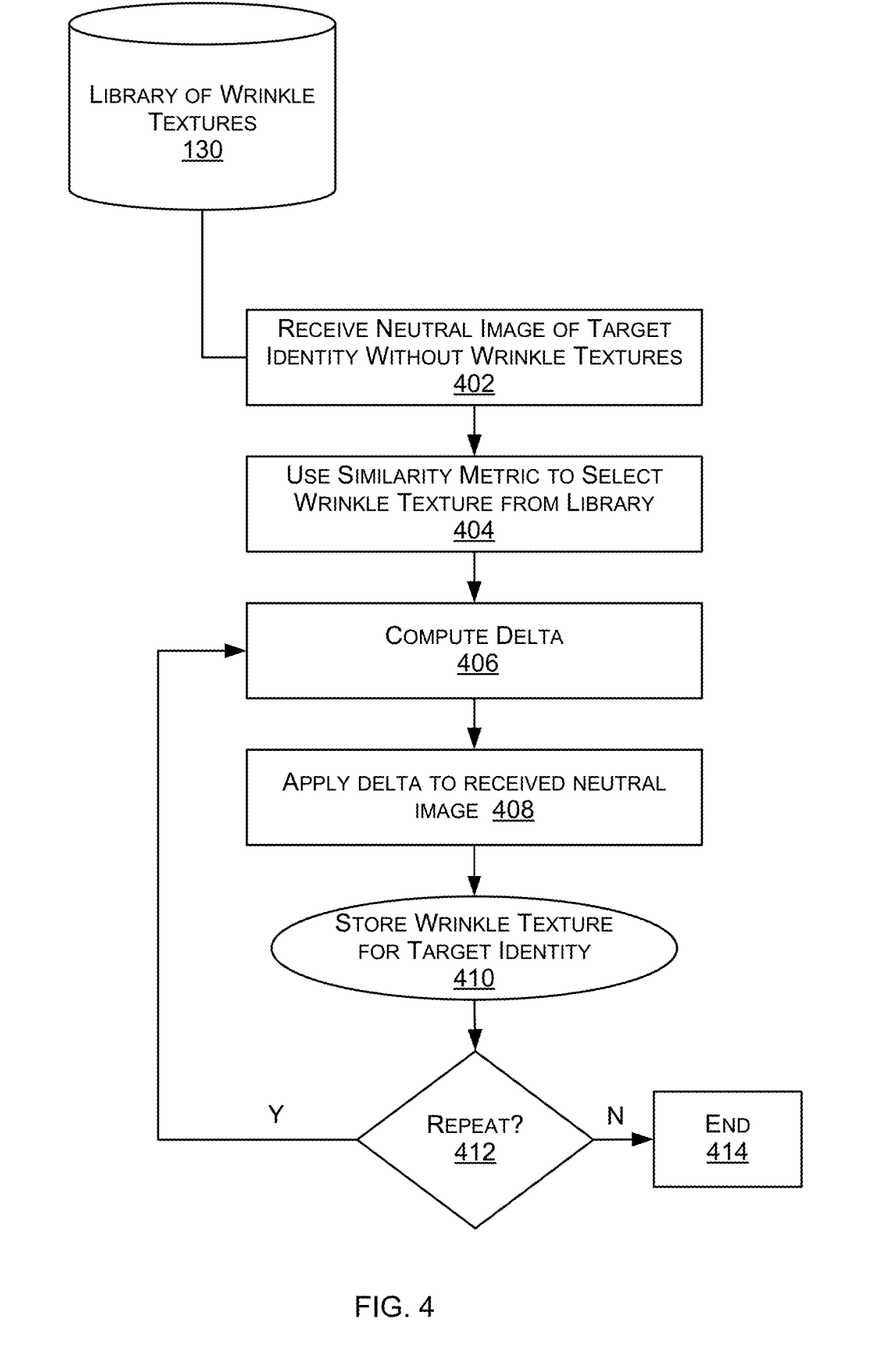
FIG. 4 is a flow diagram of a method of computing a wrinkle texture for a person or animal.

FIG. 4 is a flow diagram of a method of computing a wrinkle texture for a person or animal using so called "wrinkle grafting". A library of wrinkle textures 130 exists as explained with reference to FIG. 1. The wrinkled face synthesizer 100 receives 402 a neutral image of a target identity without wrinkle textures 402. A target identity is a person or animal for whom face images are to be synthesized. The target identity is a real or a synthetic person or animal. The neutral image which is received is an image depicting the face of the target identity with a neutral expression. No wrinkle textures are available for the target identity in the library 130 of wrinkle textures at this point of the process.

The wrinkled face synthesizer 100 uses a similarity metric 404 to select a wrinkle texture from the library 130. The similarity metric is computed between the received neutral image of the target identity and each of the neutral textures in the library 130. On the basis of the similarity metric data one of the neutral textures is selected, such as a neutral texture which is found to be most similar to the received neutral image. Any suitable similarity metric is used such as mean squared error, structural similarity index (SSIM), peak signal to noise ratio (PSNR), similarity. The similarity metric is computed between any characteristic of the neutral texture and the received image, such as pixel color. In some cases the similarity metric is computed between a mesh from the library and a mesh for the target identity.

A delta is computed 406 between the wrinkle texture of the selected identity and the neutral texture of the selected identity 406. The delta is applied 408 to the received neutral image 408 and the resulting wrinkle texture is stored in association with the target identity.

A check is made at operation 412 whether to repeat for more types of wrinkle texture according to a rule. In some cases wrinkle textures are computed only for compressed albedo and expanded albedo in addition to neutral. In some cases wrinkle textures are computed for compressed albedo, expanded albedo, compressed displacement, expanded displacement in addition to neutral. The process ends at operation 414.

Figure 5:
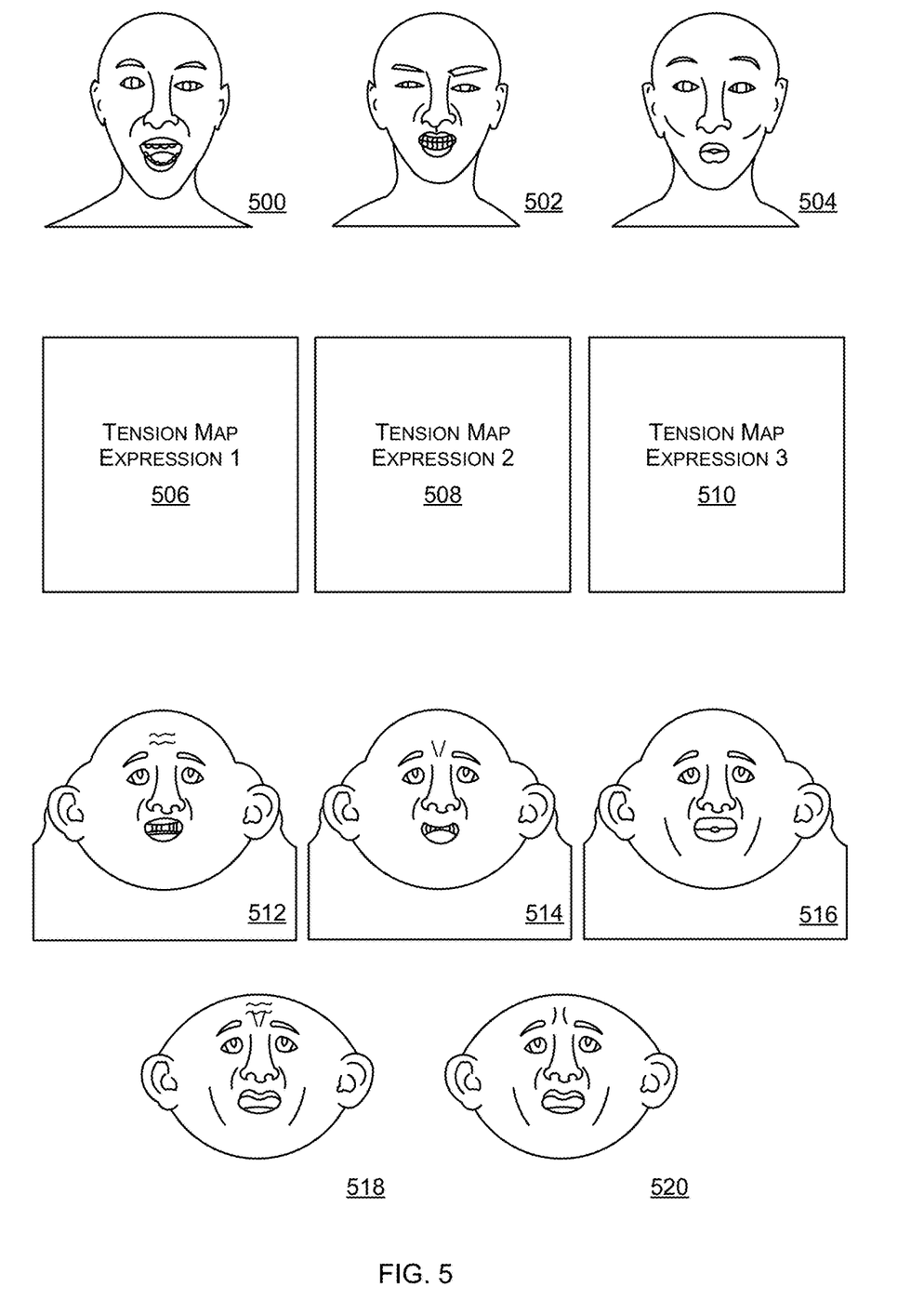
FIG. 5 is a schematic diagram of another method of computing a wrinkle texture for a person or animal.

FIG. 5 is a schematic diagram of another method of computing a wrinkle texture for a person or animal. Here the wrinkle texture is computed from real images 500, 502, 504 of a person with different facial expressions. Note that in FIG. 5 the real images are represented schematically using line drawings to meet patent office requirements. FIG. 5 illustrates the computation of albedo wrinkle textures with three raw expression images 500, 502, 504 and a neutral expression image (not shown). Each raw expression image 500, 502, 504 and the neutral expression image, has a plurality of other associated images which are not shown in FIG. 5. The raw expression image 500 depicts a woman with eyes and mouth open and a happy surprised expression. The image 500 was captured in a studio with a camera rig comprising a plurality of cameras positioned around the woman so as to have different viewpoints of the woman's face. The cameras each capture an image at the same time instant producing a plurality of images. The plurality of images are used in photogrammetry to generate a scan with an accompanying albedo texture and/or displacement texture. Any known photogrammetry process is used. The captured images, and hence the scans, are processed to be in registration with the same 3D mesh model of a face. The scans may be processed to remove hair. The scan 502 was captured in the same manner as for scan 500 and registered to the same 3D mesh model. The scan 502 depicts the same woman with a scrunched up facial expression indicating an unpleasant smell. The scan 504 was captured in the same manner as for scan 500 and registered to the same 3D mesh model. The scan 504 depicts the same woman with lips pursed, eyes open wide and eyebrows raised.

Tension maps 506, 508, 510 corresponding to the scans 500, 502, 504 are computed so there is one tension map per scan. To compute a tension map corresponding to scan 500, the scan 500 is used to compute identity and expression parameter values of a 3D mesh model of the face, by using model fitting by optimization, or by using machine learning or by using retopology using specialist industry software. The parameter values are applied to the 3D mesh model. A tension map is then computed from the 3D mesh model as now explained.

The inventors have formalized mesh tension to capture the amount of compression or expansion at each vertex of a 3D polygon mesh resulting from a deformation. More concretely, express mesh tension as a function of the mean change in the length of the edges connected to a vertex as a result of the deformation. Consider an undeformed mesh $\bar{X}=(\bar{V},\bar{E})$ with a sequence of vertices $\bar{V}$ and sequence of edges $\bar{E}$, that undergoes a deformation to result in the mesh $X=(V,E)$. Consider only deformations such that $\bar{X}$ and $X$ possess the same topology. For vertex $v_i \in V$, let $(e_1, \ldots, e_K)$ denote the sequence of K edges connected to $v_i$, with $(\bar{e}_1, \ldots, \bar{e}_K)$ denoting the corresponding edges in $\bar{X}$ connected to $\bar{v}_i$. Define the mesh tension at $v_i$ as $$t_{v_i} := 1 - \frac{1}{K} \sum_{k \in [K]} \frac{\|e_k\|}{\|\bar{e}_k\|}, \quad (1)$$

where $[K]=\{1, \ldots, K\}$, and $\|.\|$ denotes edge length. Equation one is expressed in words as the tension at vertex i of a 3D face mesh is set to the value one minus reciprocal of the number of edges originating from the vertex multiplied by the sum over the number of edges originating from the vertex of the length of the edge divided by the length of the corresponding edge in a version of the 3D face mesh representing the face with a neutral expression.

Note that the process subtracts from 1 so that positive values of $t_{v_i}$ indicate compression, negative values indicate expansion, and a value of 0 indicates no change.

In practice, for finer manual control introduce the parameters of strength s to scale the tension, and bias b to artificially favor expansion or compression, computing the weighted tension at $v_i$ as $t'_{v_i}=s \cdot t_{v_i}+b$. Further, allow for artificial propagation of expansion and compression effects through the mesh. For each effect introduce a parameter denoting the number of iterations for a morphological dilation (positive values) or erosion (negative values) operation. The propagation of each effect is first performed independently over the mesh, and the resulting tension values are added for vertices that end up with both expansion and compression.

In the case of the neutral expression the tension map has zeros for the tension value at each vertex.

In an example, once tension values have been computed for each vertex of the 3D face mesh, UV tension maps are computed.

Face image 500 and its associated images are used to compute an albedo texture which is a UV map as indicated at 512 in FIG. 5. Face image 502 and its associated images are used to compute a second albedo texture 514. Face image 504 and its associated images are used to compute a third albedo texture 516.

With reference to FIG. 5 albedo textures 512, 514, 516 and the neutral albedo texture (not shown) are combined using the respective tension maps as weights to obtain an expanded albedo wrinkle texture 518 and a compressed albedo wrinkle texture 520. In this example, three albedo textures and a neutral albedo texture are used to create one compressed albedo texture and one expanded albedo texture. However, it is possible to use more than four albedo textures.

In an example, the tension at each vertex is used as a weight in a linear combination of cleaned textures across expressions, with zero tension corresponding to the neutral textures. In an example, use linear aggregation by linearly combining albedo textures using the normalized tension as weights to obtain the expanded and compressed wrinkle textures 518, 520. Other aggregation methods are possible such as softmax, or maximum aggregation where the weighted textures are compared and the maximum value per image element location is selected to use in the output wrinkle texture. In other examples, the weights to be used are learnt as now explained. For each scan depicting a non-neutral expression render a synthesized version using the 3D face mesh and calculated wrinkle textures. Then compare the rendered image to the real one to obtain a loss and back propagate to update the weights used to form the wrinkle textures. This type of supervised training results in weights that give the most faithful reproductions of the input scans when rendered using the calculated wrinkle map; in theory the most accurate wrinkle map based on the observations.

FIG. 5 shows the process for albedo textures. The same procedure is applied to obtain displacement wrinkle textures. In this case, the face image 500 and its associated images are used to compute distances from a camera viewpoint to a surface of the face. Because the wrinkles cause skin to protrude or retract there are differences in displacement from the 3D mesh surface as compared to a neutral expression absent wrinkles. The distances are formed into a UV displacement texture (not shown). The same is done for the other expressions to obtain displacement textures. The displacement textures are combined to form a compressed displacement wrinkle texture and an expanded displacement wrinkle texture.

The process of FIG. 5 is data driven so that the resulting wrinkle textures are computed from empirical data.

Figure 6:
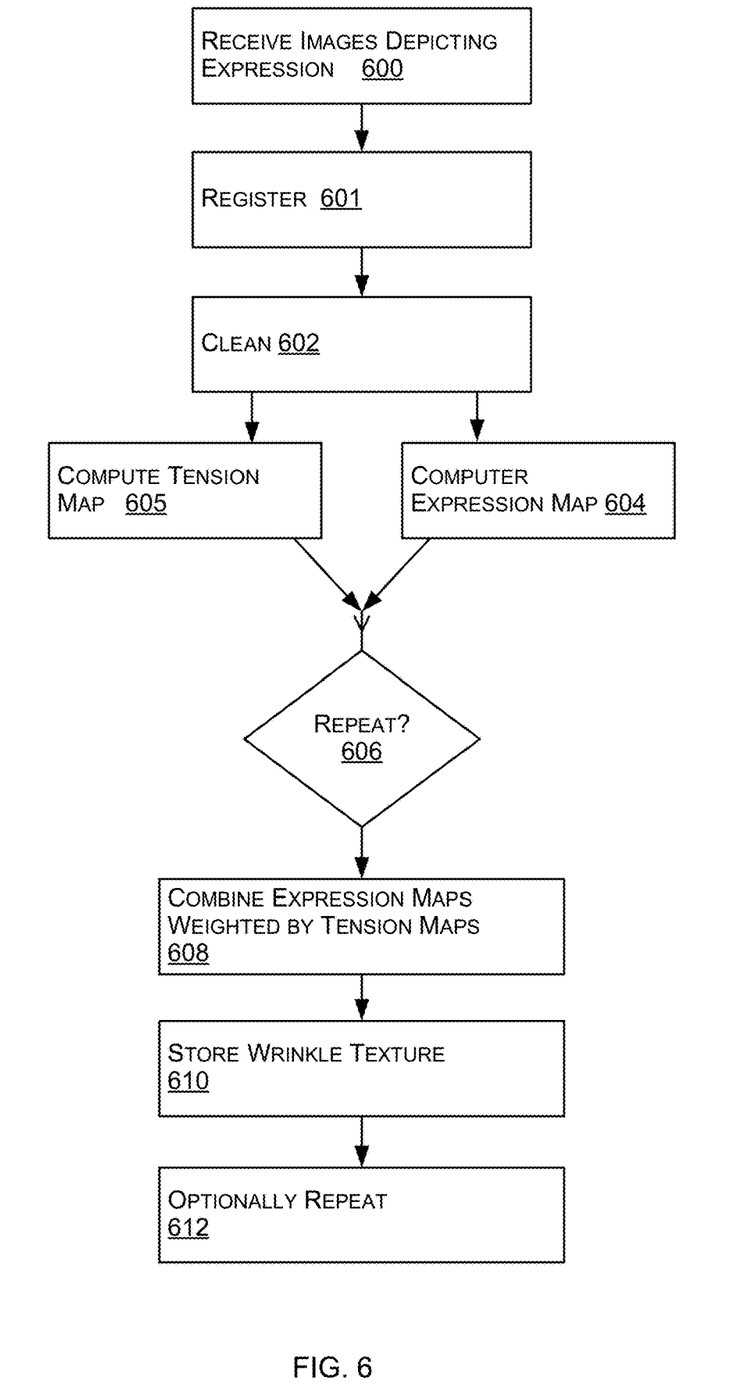
FIG. 6 is a flow diagram of the method of FIG. 5.

FIG. 6 is a flow diagram of the method of FIG. 5. Images depicting a face with an expression are received. The images are a plurality of images captured at the same time instant by different capture devices that have different viewpoints of the face. The capture device viewpoints are known. The images are registered 601 to a common topology such as by registering the images to a 3D face mesh modelling the face depicted in the images. The registration process, when highly accurate, is time consuming and computationally expensive. Each image depicting the face has to be registered so that each individual vertex in the 3D mesh represents the same surface of the face in each of the images. As part of the registration process, photogrammetry is used to compute a scan and one or both of an albedo texture and a displacement texture.

After the registration process the albedo texture and/or displacement texture are cleaned 602. In an example the cleaning comprises removing depiction of hair. In some cases sensor noise is removed as part of the cleaning process. In an example, an automated cleaning process is used. Using an automated cleaning process is a significant benefit since manual cleaning is error prone and expensive. In an example the automated pre-processing comprises: computing a difference between a manually pre-processed texture of the first face with a neutral expression, and a texture of the first face with an expression; computing a fine mask from the difference; and using the fine mask as part of the automated pre-processing. In an example, the automated pre-processing is a two-stage process, where a first stage comprises applying a coarse mask to the texture of the first face to filter out artifacts outside a specified region of the face, and then using a second stage whereby the fine mask is applied to the texture of the first face.

The manual cleaning of scans is a labor-intensive process. To automate the process of masking noise and/or hair artifacts from the expression scans, various examples utilize the difference between the raw and manually cleaned neutral scans. Concretely, employ a two-stage masking procedure. First, apply an identity-agnostic coarse mask to filter most artifacts outside of a hockey-mask and neck regions where expression-based wrinkling occurs. Next, to capture manual changes made by artists in the cleaning of each neutral scan, employ a Gaussian Mixture Model-based background subtraction technique or other background subtraction technique. Treating the clean neutral textures as background and the raw original ones as foreground, obtain an identity-specific mask of the noise and hair artifacts for every identity. Apply this fine mask to clean the textures from the corresponding expression scans for each identity.

The registered, cleaned textures are used to compute a tension map 605. The tension map is computed as described above with reference to FIG. 5. In this example there is one expression depicted in the received images and so there is one tension map.

The registered, cleaned textures are also used to compute 604 an expression map. The expression map is a UV map formed from the received images. In this example there is one expression depicted in the received images and so there is one expression map.

A check is made at decision 606 whether to repeat the process for more expressions such as by checking whether a threshold number of expression maps have been computed or by checking whether more received images are available. If the decision is to repeat, the process returns to operation 600 and receives images depicting the same face with another facial expression different from the first facial expression. The received images are registered 601 and cleaned 602 and another tension map is computed 605 together with another expression map 604. Operations 605 and 604 optionally proceed in parallel.

At least one of the expression maps computed by operation 604 is for a neutral expression and in this case the corresponding tension map computed by operation 605 has zeros for the tension values at each vertex.

When decision point 606 determines that enough expression maps 604 are computed the process proceeds to operation 608 where the expression maps, including the expression map for the neutral expression are combined 608 in a manner weighted by the respective tension maps. As explained above, each expression map has an associated tension map as a result of the process of FIG. 6. An individual expression map is weighted by its corresponding tension map, such as by computing so as to take a value with maximum tension or by computing a weighted sum based on tension values (linear), or by computing a softmax across tension values. The weighted expression maps are then aggregated by addition or in any other suitable manner.

The result of operation 608 is a wrinkle texture. The wrinkle texture is stored 610.

The whole method of FIG. 6 optionally repeats 612 to form different types of wrinkle texture such as one or more of: a compressed albedo wrinkle texture, an expanded albedo wrinkle texture, a compressed displacement wrinkle texture, an expanded displacement wrinkle texture. To form a compressed albedo wrinkle texture, operation 604 is configured to compute an albedo expression map and operation 608 is configured to use an aggregation method such as any of: linear aggregation, taking a maximum value, computing a softmax, using learnt weights to make a weighted aggregation. As mentioned above, positive values of $t_{v_i}$ indicate compression, negative values indicate expansion, and a value of 0 indicates no change. The compressed albedo wrinkle texture holds absolute compression values. To form an expanded albedo wrinkle texture, operation 604 is configured to compute an albedo expression map and operation 608 is configured to use an aggregation method such as any of: linear aggregation, taking a maximum value, computing a softmax, using learnt weights to make a weighted aggregation. The expanded albedo wrinkle texture holds the absolute expansion values. To form a compressed displacement wrinkle texture, operation 604 is configured to compute a displacement expression map and operation 608 is configured to use an aggregation method such as any of: linear aggregation, taking a maximum value, computing a softmax, using learnt weights to make a weighted aggregation. The compressed displacement wrinkle texture holds absolute compression values. To form an expanded displacement wrinkle texture, operation 604 is configured to compute a displacement expression map and operation 608 is configured to use an aggregation method such as any of: linear aggregation, taking a maximum value, computing a softmax, using learnt weights to make a weighted aggregation. The expanded displacement wrinkle texture holds absolute expansion values.

It is not essential to use both albedo wrinkle textures and displacement wrinkle textures. In some examples, only albedo compressed and expanded wrinkle textures are used. In some examples, only displacement compressed and expanded wrinkle textures are used.

The processes of FIGS. 5 and 6 gives an efficient yet effective method for capturing complex wrinkling effects for an identity from high-resolution scans (the received images) of their posed expressions.

Figure 7:
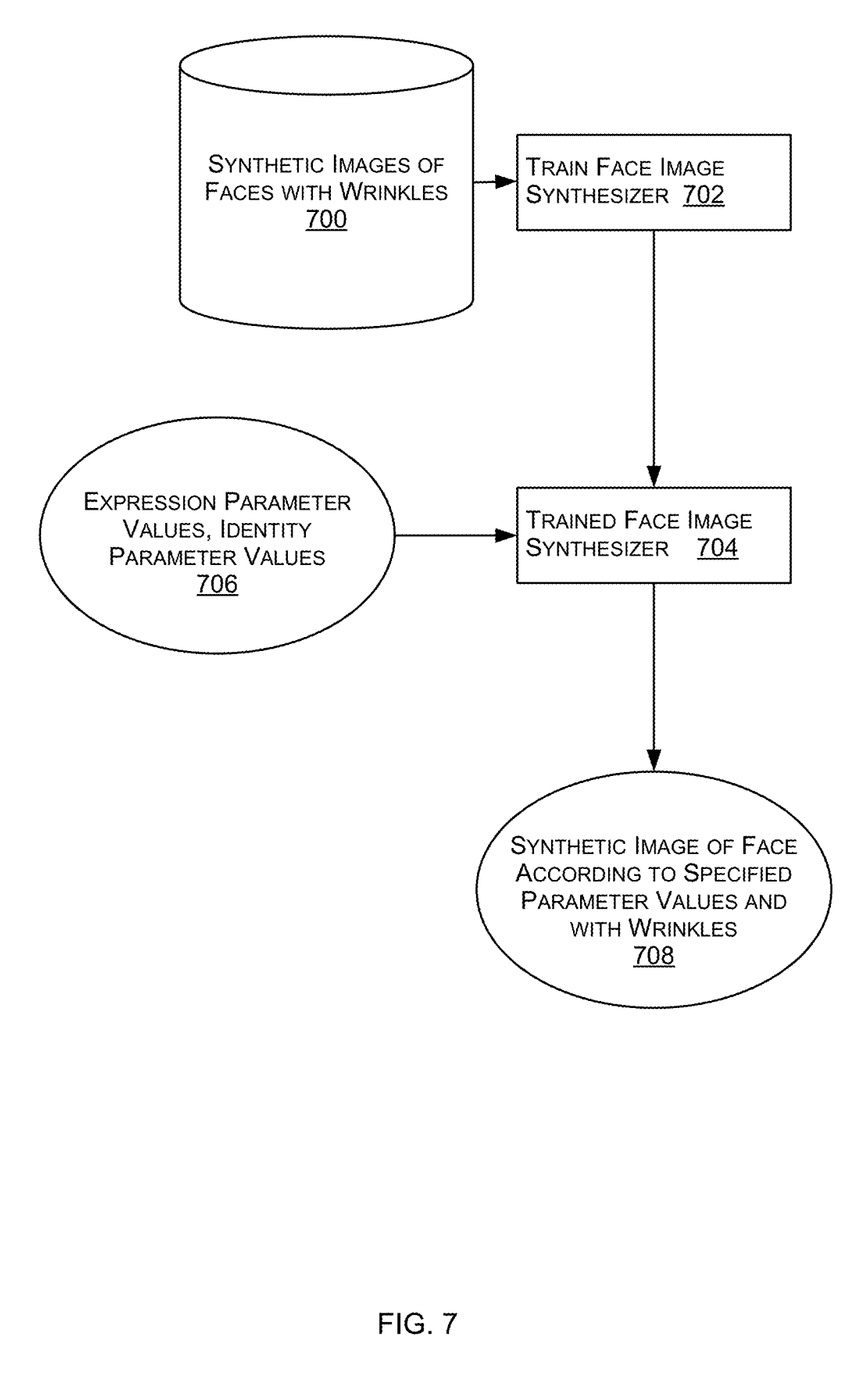
FIG. 7 is a flow diagram of a method of training and using a face synthesizer.

FIG. 7 is a flow diagram of a method of training and using a face synthesizer. The process of FIG. 3 is used to compute a plurality of synthetic images of faces with wrinkles and these are stored in database 700. The synthetic images of faces with wrinkles from store 700 are used to train a face image synthesizer 702.

The trained face image synthesizer 704 is able to receive an input comprising expression parameter values and identity parameter values 706 and generate a synthetic image 708 of a face according to the parameter values and with wrinkles.

By using synthetic training data as from store 700 it is unexpectedly found that the trained face image synthesizer 704 has improved performance as compared with when it is trained using real images. In an example, The present technology has been tested empirically as now explained. A set of high-quality commercially available 3D scans of 208 individuals was obtained. All 208 identities contain scans with neutral expressions, while 52 contain additional scans for posed expressions. The neutral scans for each identity were manually cleaned for removing noise and hair, and registered to the topology of a 3D face model resulting in a mesh of 7,667 vertices and 7,414 polygons.

The 3D scans were used as described herein to generate synthetic images of faces with expressions and appropriate wrinkles. As a training dataset 100 k synthetic images were rendered, consisting of 20 k identities with 5 frames for each identity (different view-points, expressions, and environments). Ground-truth annotations of 703 dense 2D landmarks were generated from the face-meshes to accompany each image.

The synthetic images of faces in the training dataset were then used to train a neural network to detect facial landmarks. The neural network was an off-the-shelf ResNet 101. A 256×256 pixel red green blue (RGB) image was used as input to predict 703 dense facial landmarks.

Another version of the same neural network was trained on the same task using real images of faces.

It was found that for eye region results on datasets referred to as 300 W, 300 W-winks and Pexels the synthetic-only trained approaches outperform real-data based models. The following table shows different methods in the rows and performance on different data sets in the columns. The performance of the trained neural network on the landmark detection task is expressed as a numerical value. The following tables gives eye-opening errors for the Pexels data set, and eyelid point-to-polyline errors for the 300 W dataset and the winks subset. In all cases normalized by bounding-box diagonal. Lower is better. Errors for eyelid-landmarks are computed by taking a point-to-line distance from every predicted eyelid landmark to the corresponding polyline defining an eyelid in ground truth.

| Method | Pexels | 300W | 300W-winks |
|---|---|---|---|
| Trained on Real Data | 3.60 | 0.81 | 1.32 |
| Trained on Synthetic Data | | | |
| No wrinkles | 0.97 | 0.51 | 0.86 |
| With wrinkles computed as described herein | 0.86 | 0.48 | 0.74 |

The Pexels dataset contains images of 318 images of fully closed eyes (because of blinking, scrunching or compressing the face) and 105 images with only a single eye closed (winking). This allows to assess model performance under such conditions which are rare in other datasets. Knowing which images contain fully closed eyes or just a single eye closed allows to measure eyelid accuracy without explicit landmark annotations. Define the eye opening error as the mean eye aperture of both eyes in the eye-closed case and eye aperture of closed eye in the wink case.

The 300 W dataset is a commercially available dataset of faces. A small subset of 30 images from 300 W was identified that contain winks and compressed face expressions (300 W-winks) to provide a more nuanced indication of performance under such deformations.

In another example the synthetic face images with wrinkles are used to train a machine learning system to predict surface normals. Surface normal can be used to infer 3D information about a surface from 2D images and are useful for clothing and face-shape reconstruction and relighting. In an example a U-Net is trained with a ResNet 18 encoder to predict camera surface-normals of the face. As input use 256×256 pixel RGB images from a dataset of 50 k synthetic images (10 k identities with 5 frames per identity). The network was trained for 200 epochs using PyTorch with a learning rate of 1 e−3 using cosine similarity loss. Camera-space surface normal images rendered as part of the synthetic data pipeline described herein were used a ground-truth. The network trained on synthetic images with mesh-tension driven wrinkles resulted in predictions with significantly more high-frequency detail on the face than that trained on data without mesh-tension driven wrinkles.

Figure 8:
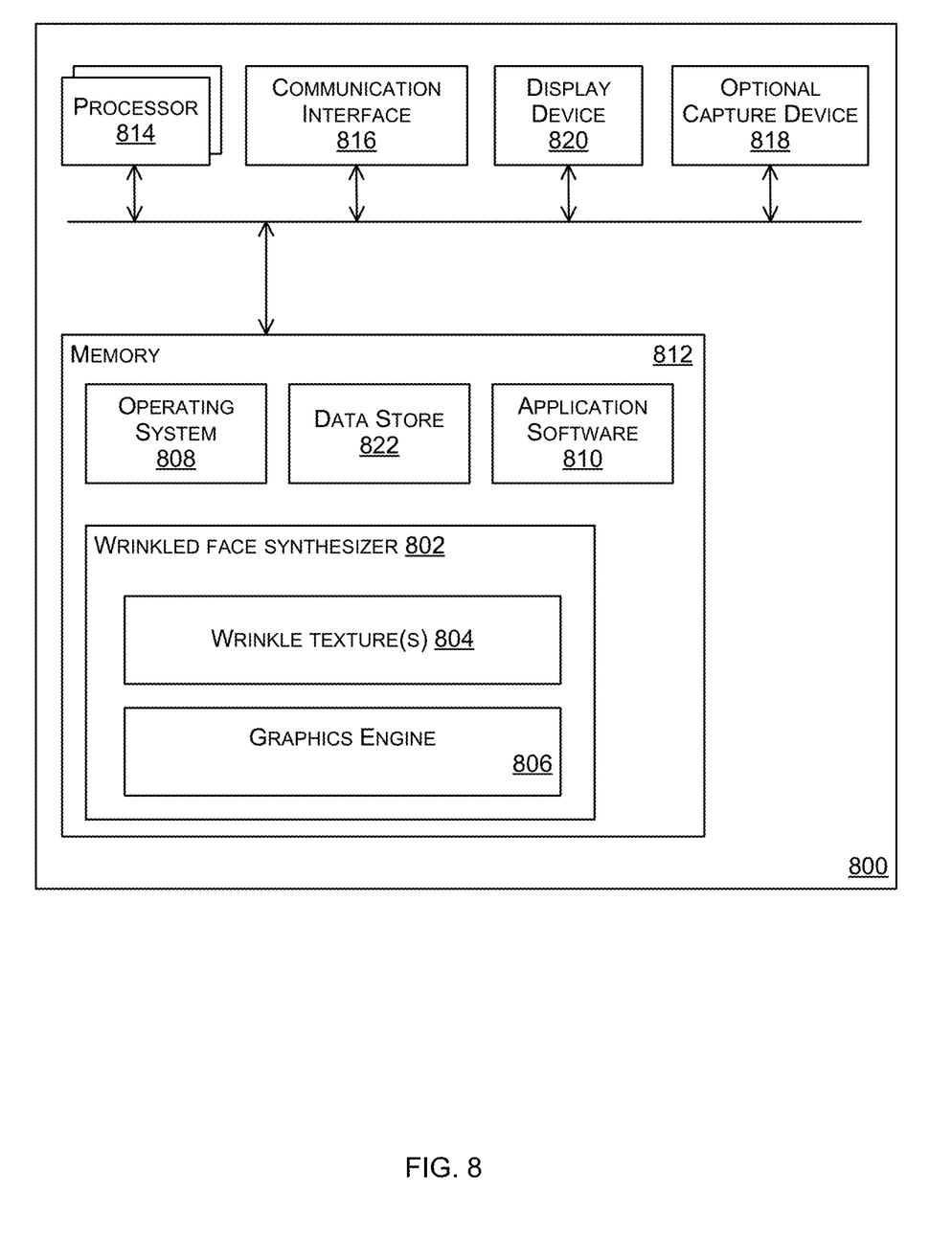
FIG. 8 illustrates an exemplary computing-based device in which embodiments of a wrinkled face synthesizer are implemented.

FIG. 8 illustrates various components of an exemplary computing-based device 800 which are implemented as any form of a computing and/or electronic device, and in which embodiments of a wrinkled face synthesizer 802 are implemented in some examples.

Computing-based device 800 comprises one or more processors 814 which are microprocessors, controllers or any other suitable type of processors for processing computer executable instructions to control the operation of the device in order to compute wrinkle textures 804 and use wrinkle textures to render synthetic images of faces with expressions and wrinkles appropriate to the expressions. In some examples, for example where a system on a chip architecture is used, the processors 814 include one or more fixed function blocks (also referred to as accelerators) which implement a part of the method of any of FIGS. 3 to 7 in hardware (rather than software or firmware). Wrinkled face synthesizer 802 comprises wrinkle textures 804 and graphics engine 806. Platform software comprising an operating system 808 or any other suitable platform software is provided at the computing-based device to enable application software 810 to be executed on the device. Data store 822 holds parameter values, images, expression maps, 3D face mesh models and other data.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage is, in some examples, distributed or located remotely and accessed via a network or other communication link (e.g. using communication interface 816). The computing-based device 800 also comprises an optional capture device 818 to capture images of faces or other scenes.

Alternatively, or in addition to the other examples described herein, examples include any combination of the following:

Clause A. A computer-implemented method of computing an image depicting a face of a person or animal, the method comprising:
  accessing a 3D polygon mesh model of a face of the person or animal having a non-neutral expression;
  computing a tension map from the 3D polygon mesh model, the tension map comprising, for an individual vertex of the 3D polygon mesh, an amount of compression to be applied to move the vertex to a position modelling the face of the person with a neutral expression, and an amount of expansion to be applied to move the vertex to a position modelling the face of the person with a neutral expression;
  obtaining, for a first face:
    a neutral texture, a compressed wrinkle texture and an expanded wrinkle texture,
    where the neutral texture comprises a map of the first face with a neutral expression, and the compressed wrinkle texture is a map of the first face formed by aggregating maps of the first face with different expressions using the tension map, and the expanded wrinkle texture comprises a map of the first face formed by aggregating maps of the first face with different expressions using the tension map;
  applying the wrinkle textures to the 3D model according to the tension map; and
  rendering the image from the 3D model.

Clause B. The method of clause A comprising using a graphics engine to apply the wrinkle textures to the 3D model and to render the image, wherein the graphics engine is a rasterization engine using rasterization to render the image from the 3D model, or the graphics engine is a ray-tracing engine using ray-tracing to render the image from the 3D model.

Clause C. The method of any preceding clause wherein the first face is the face of the person or animal and the maps of the first face are registered to a common topology with the 3D polygon mesh model.

Clause D. The method of any preceding clause wherein at least one of the maps of the first face is pre-processed to remove hair using automated pre-processing.

Clause E. The method of clause D wherein the automated pre-processing comprises: computing a difference between a manually pre-processed map of the first face with a neutral expression, and a map of the first face with an expression; computing a fine mask from the difference; and using the fine mask as part of the automated pre-processing.

Clause F. The method of clause E wherein the automated pre-processing is a two-stage process, where a first stage comprises applying a coarse mask to the map of the first face to filter out artifacts outside a specified region of the face, and then using a second stage whereby the fine mask is applied to the map of the first face.

Clause G. The method of any preceding claim wherein the first face is a different face and the neutral texture, the compressed wrinkle texture and the expanded wrinkle texture are obtained from a library of wrinkle textures.

Clause H. The method of clause G comprising receiving an image of a target identity with a neutral expression; using a similarity metric to select a neutral texture from the library, the neutral texture having an associated compressed wrinkle texture and an associated expanded wrinkle texture.

Clause I. The method of clause H comprising computing a delta between the associated compressed or expanded wrinkle texture and the selected neutral texture, and
  applying the delta to the received image of the target identity with a neutral expression to form a wrinkle texture for the target identity; and
  applying the delta to the received image of the target identity to form a compressed or expanded wrinkle texture for the target identity respectively.

Clause J. The method of any preceding clause wherein the compressed wrinkle texture is an albedo texture, and wherein the expanded wrinkle texture is an albedo texture and the maps are color maps.

Clause K. The method of clause J comprising obtaining, for the first face, a compressed wrinkle texture which is a displacement texture, and an expanded wrinkle texture which is a displacement texture, and wherein the graphics engine is used to apply the displacement textures to the 3D model according to the tension map.

Clause L. The method of any of clauses A to I wherein the compressed wrinkle texture is a displacement wrinkle texture, the expanded wrinkle texture is a displacement texture and the maps are displacement maps.

Clause M. The method of any preceding clause comprising aggregating the maps by any of: linear aggregation, maximum aggregation, softmax aggregation, weighted aggregation using learnt weights.

Clause N. The method of any preceding clause comprising repeating the method for different non-neutral expressions of the face, so as to render a plurality of images depicting the face with wrinkles, and using the plurality of images to train a machine learning model.

Clause O. The method of clause N wherein the machine learning model is a face image synthesizer or a facial landmark recognition system or a normal map prediction system.

Clause P. An apparatus comprising:
at least one processor;
a memory storing instructions that, when executed by the at least one processor, perform a method for computing an image depicting a face, the method comprising:
accessing a 3D polygon mesh model of a face of a person or animal having a non-neutral expression;
computing a tension map from the 3D polygon mesh model, the tension map comprising, for an individual vertex of the 3D polygon mesh, an amount of compression to be applied to move the vertex to a position modelling the face of the person with a neutral expression, and an amount of expansion to be applied to move the vertex to a position modelling the face of the person with a neutral expression;
obtaining, for a first face which is the face of the person or animal, or a different face:
a neutral texture, a compressed wrinkle texture and an expanded wrinkle texture,
where the neutral texture comprises a color map of the first face with a neutral expression, and the compressed wrinkle texture is a map of the first face formed by aggregating maps of the first face with different expressions, and the expanded wrinkle texture comprises a map of the first face formed by aggregating maps of the first face with different expressions;
applying the wrinkle textures to the 3D model according to the tension map; and
rendering the image from the 3D model.

Clause Q. A computer-implemented method comprising:
accessing a 3D polygon mesh model of a face having a non-neutral expression;
computing a tension map from the 3D polygon mesh model, the tension map comprising, for an individual vertex of the 3D polygon mesh, an amount of compression to be applied to move the vertex to a position modelling the face of the person with a neutral expression, and an amount of expansion to be applied to move the vertex to a position modelling the face of the person with a neutral expression;
accessing a plurality of maps of the face under different expressions, the maps being registered to a topology of the 3D polygon mesh;
computing a weighted combination of the maps to produce a compressed wrinkle texture, wherein the weights used in the weighted combination are negative weights from the tension map;
computing a weighted combination of the maps to produce an expanded wrinkle texture, wherein the weights used in the weighted combination are positive weights from the tension map;
storing the compressed wrinkle texture and the expanded wrinkle texture for use in computing renders of faces under expression with wrinkles.

Clause R. The method of clause Q wherein the weighted combination comprises any of: linear aggregation, maximum aggregation, softmax aggregation, weighted aggregation using learnt weights.

Clause S. The method of clause Q or clause R wherein the maps are color maps and the expanded wrinkle texture is an expanded albedo wrinkle texture, and the compressed wrinkle texture is a compressed albedo wrinkle texture.

Clause T. The method of clause S comprising accessing a plurality of displacement maps of the face under different expressions, the displacement maps being registered to a topology of the 3D polygon mesh; and
computing a weighted combination of the displacement maps to produce a compressed displacement wrinkle texture, wherein the weights used in the weighted combination are negative weights from the tension map;
computing a weighted combination of the maps to produce an expanded displacement wrinkle texture, wherein the weights used in the weighted combination are positive weights from the tension map;
storing the compressed displacement wrinkle texture and the expanded displacement wrinkle texture.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for computing an image depicting a face of a person or animal, the method comprising:
    accessing a 3D polygon mesh model of a face having an expression, the face comprising the face of the person or the face of the animal;
    computing a tension map from the 3D polygon mesh model, the tension map comprising, for a vertex of the 3D polygon mesh model, an amount of compression to be applied to move the vertex to a position modelling the face, and an amount of expansion to be applied to move the vertex to the position modelling the face;
    obtaining wrinkle textures for the face, the wrinkle textures comprising one or more of the following: a neutral texture, a compressed wrinkle texture, and an expanded wrinkle texture, wherein the neutral texture comprises a map of the face with a neutral expression, and wherein the compressed wrinkle texture and the expanded wrinkle textures are maps of the face formed by aggregating maps of the face with different expressions using the tension map;
    applying the wrinkle textures to the 3D polygon mesh model according to the tension map; and
    rendering the image from the 3D polygon mesh model having the applied wrinkle textures.

2. The method of claim 1, further comprising using a graphics engine to:
    apply the wrinkle textures to the 3D polygon mesh model; and
    render the image, wherein the graphics engine is one of the following: a rasterization engine using rasterization to render the image from the 3D polygon mesh model, or a ray-tracing engine using ray-tracing to render the image from the 3D polygon mesh model.

3. The method of claim 1, wherein the maps of the face are registered to a common topology with the 3D polygon mesh model.

4. The method of claim 1, wherein the maps of the face are pre-processed to remove hair using automated pre-processing.

5. The method of claim 4, wherein the automated pre-processing comprises:
    computing a difference between a manually pre-processed map of the face with a neutral expression and a map of the face with the expression;
    computing a fine mask from the difference; and
    using the fine mask as part of the automated pre-processing.

6. The method of claim 5, wherein the automated pre-processing is a two-stage process, wherein a first stage comprises applying a coarse mask to the map of the face to filter out artifacts outside a specified region of the face, and wherein a second stage comprises applying the fine mask to the map of the face.

7. The method of claim 1, further comprising:
    receiving an image of a target identity with a neutral expression; and
    using a similarity metric to select the neutral texture from a library, the neutral texture having an associated compressed wrinkle texture and an associated expanded wrinkle texture.

8. The method of claim 7, further comprising:
    computing a delta between the associated compressed or expanded wrinkle texture and the selected neutral texture, and
    applying the delta to the received image of the target identity with a neutral expression to form a compressed or expanded wrinkle texture for the target identity respectively.

9. The method of claim 1, wherein the compressed wrinkle texture is an albedo texture, and wherein the expanded wrinkle texture is an albedo texture and the maps are color maps.

10. The method of claim 9, further comprising obtaining, for the face, a compressed wrinkle texture which is a displacement texture, and an expanded wrinkle texture which is a displacement texture, and wherein a graphics engine is used to apply the displacement textures to the 3D polygon mesh model according to the tension map.

11. The method of claim 1, wherein the compressed wrinkle texture is a displacement wrinkle texture, the expanded wrinkle texture is a displacement texture, and the maps are displacement maps.

12. The method of claim 1, further comprising aggregating the maps by one of the following: linear aggregation, maximum aggregation, softmax aggregation, or weighted aggregation using learnt weights.

13. An apparatus comprising:
    a processor; and
    a memory storing computer-executable instructions that, when executed by the processor, cause the processor to perform the following operations:
        accessing a 3D polygon mesh model of a face having an expression, the face comprising a face of a person or a face of an animal;
        computing a tension map from the 3D polygon mesh model, the tension map comprising, for a vertex of the 3D polygon mesh model, an amount of compression to be applied to move the vertex to a position modelling the face, and an amount of expansion to be applied to move the vertex to the position modelling the face;
        obtaining wrinkle textures for the face, the wrinkle textures comprising one or more of the following: a neutral texture, a compressed wrinkle texture, and an expanded wrinkle texture, wherein the neutral texture comprises a map of the face with a neutral expression, and wherein the compressed wrinkle texture and the expanded wrinkle textures are maps of the face formed by aggregating maps of the face with different expressions using the tension map;

applying the wrinkle textures to the 3D polygon mesh model according to the tension map; and rendering the image from the 3D polygon mesh model having the applied wrinkle textures.

14. The apparatus of claim 13, further comprising:

a graphics engine configured to:

apply the wrinkle textures to the 3D polygon mesh model; and render the image, wherein the graphics engine is one of the following: a rasterization engine using rasterization to render the image from the 3D polygon mesh model, or a ray-tracing engine using ray-tracing to render the image from the 3D polygon mesh model.

15. The apparatus of claim 13, wherein the computer-executable instructions further cause the processor to perform the following operations:

receiving an image of a target identity with a neutral expression; and using a similarity metric to select the neutral texture from a library, the neutral texture having an associated compressed wrinkle texture and an associated expanded wrinkle texture.

16. The apparatus of claim 15, wherein the computer-executable instructions further cause the processor to perform the following operations:

computing a delta between the associated compressed or expanded wrinkle texture and the selected neutral texture, and applying the delta to the received image of the target identity with a neutral expression to form a compressed or expanded wrinkle texture for the target identity respectively.

17. A computer-readable medium comprising computer-executable instructions that, when executed by a processor, cause the processor to perform the following operations:

accessing a 3D polygon mesh model of a face having an expression, the face comprising a face of a person or a face of an animal;

computing a tension map from the 3D polygon mesh model, the tension map comprising, for a vertex of the 3D polygon mesh model, an amount of compression to be applied to move the vertex to a position modelling the face, and an amount of expansion to be applied to move the vertex to the position modelling the face;

obtaining wrinkle textures for the face, the wrinkle textures comprising one or more of the following: a neutral texture, a compressed wrinkle texture, and an expanded wrinkle texture, wherein the neutral texture comprises a map of the face with a neutral expression, and wherein the compressed wrinkle texture and the expanded wrinkle textures are maps of the face formed by aggregating maps of the face with different expressions using the tension map;

applying the wrinkle textures to the 3D polygon mesh model according to the tension map; and rendering the image from the 3D polygon mesh model having the applied wrinkle textures.

18. The computer-readable medium of claim 17, wherein the computer-executable instructions further cause the processor to perform the following operations:

applying, using a graphics engine, the wrinkle textures to the 3D polygon mesh model; and rendering the image, wherein the graphics engine is one of the following: a rasterization engine using rasterization to render the image from the 3D polygon mesh model, or a ray-tracing engine using ray-tracing to render the image from the 3D polygon mesh model.

19. The computer-readable medium of claim 17, wherein the computer-executable instructions further cause the processor to perform the following operations:

receiving an image of a target identity with a neutral expression; and using a similarity metric to select the neutral texture from a library, the neutral texture having an associated compressed wrinkle texture and an associated expanded wrinkle texture.

20. The apparatus of claim 19, wherein the computer-executable instructions further cause the processor to perform the following operations:

computing a delta between the associated compressed or expanded wrinkle texture and the selected neutral texture, and applying the delta to the received image of the target identity with a neutral expression to form a compressed or expanded wrinkle texture for the target identity respectively.

* * * * *